No. 732,699. PATENTED JULY 7, 1903.
M. S. BELL.
THERMOSTATIC APPARATUS.
APPLICATION FILED AUG. 31, 1901.
NO MODEL. 2 SHEETS—SHEET 1.

WITNESSES:
Gustave Dieterich.
John Lotka

INVENTOR
Major S. Bell
BY
Briesen & Knauth
ATTORNEYS

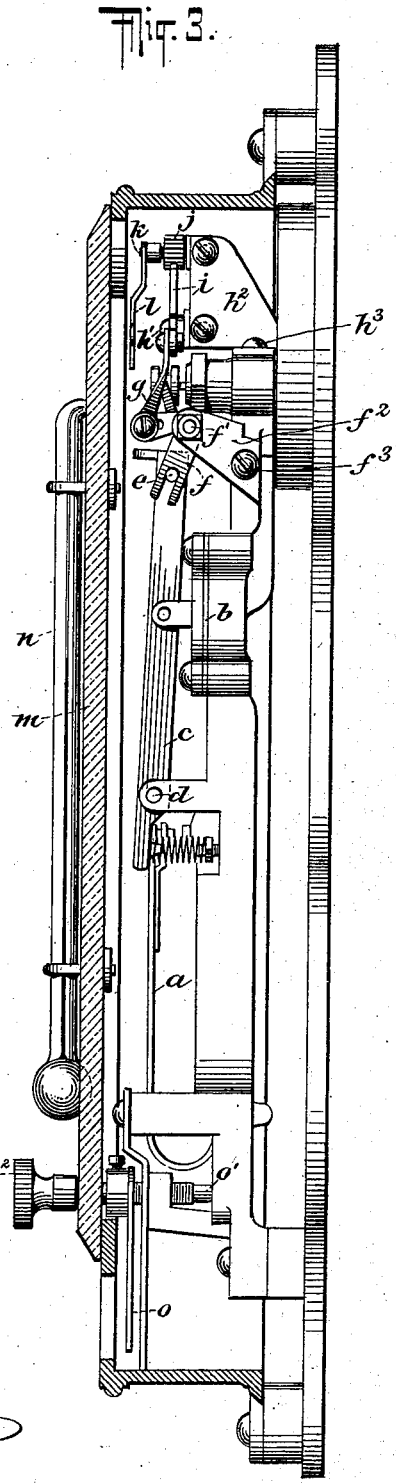

No. 732,699. Patented July 7, 1903.

UNITED STATES PATENT OFFICE.

MAJOR S. BELL, OF NEW YORK, N. Y.

THERMOSTATIC APPARATUS.

SPECIFICATION forming part of Letters Patent No. 732,699, dated July 7, 1903.

Application filed August 31, 1901. Serial No. 73,919. (No model.)

*To all whom it may concern:*

Be it known that I, MAJOR STANLEY BELL, a subject of the King of Great Britain and Ireland, residing in the borough of Manhattan, city, county, and State of New York, have invented certain new and useful Improvements in Thermostatic Apparatus, of which the following is a specification.

My invention relates to thermostats such as are used to control the heat in a room or building by governing the action of a valve or damper which admits the steam or other heating fluid.

The object of my invention is to provide a thermostat of any suitable construction that will clearly indicate to the eye whether the valve or damper admitting the heating fluid is open or closed. Usually thermostats located in rooms are supplied with thermometers and an arrangement is provided by which a person is enabled to open or close the supply-valve more or less by the action of the thermostat. It frequently occurs, however, that the temperature in a room exceeds the intended temperature, not because the heating fluid controlled by the thermostat is admitted too freely, but because other temporary reasons, as an influx of warm air from other rooms, an open fire in the room, or the like, supply an additional amount of heat independently of the radiator fed by the steam or other heating medium. Thus if the occupant of the room finds too high a temperature and attempts to correct it by regulating the thermostat to admit less heating fluid to the radiator it may often occur that after the temporary influences increasing the heat have ceased to act the radiator will fail to furnish the required amount of heat. By the use of my invention, as described hereinafter, it becomes possible and easy to ascertain at any time whether the excess of temperature is due to the action of the radiator and has therefore to be corrected by an adjustment of the thermostat or is due to other causes, in which case an adjustment of the thermostat is of course not necessary.

Reference is to be had to the accompanying drawings, in which—

Figure 1:
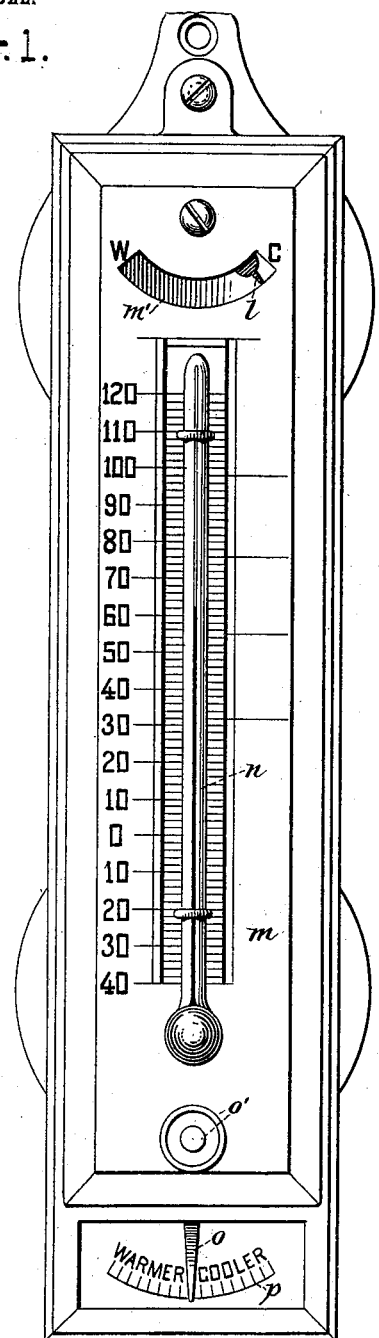
Figure 2:
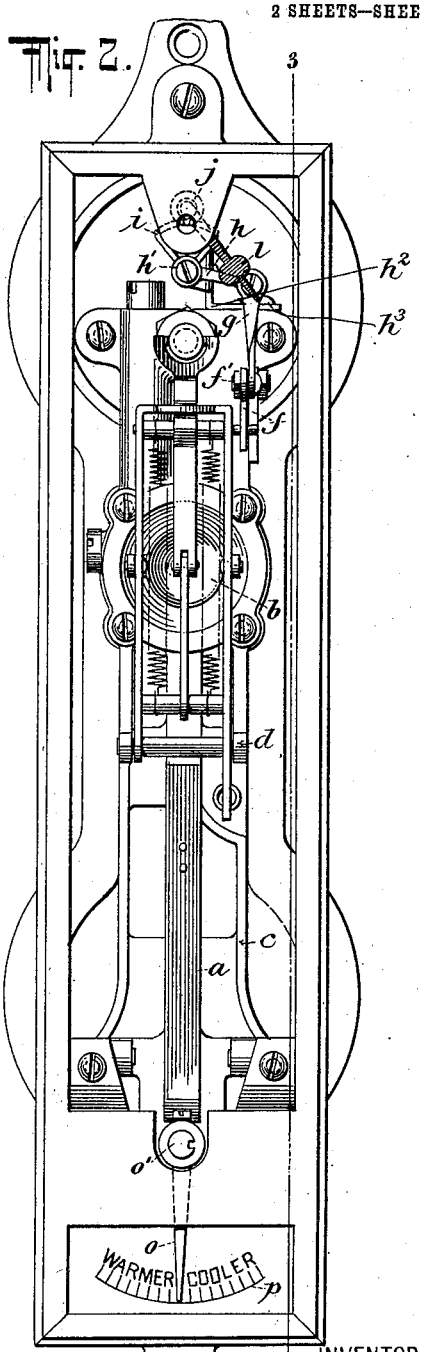

Figure 1 is a face view of the thermostat provided with my improved attachment. Fig. 2 is a similar view thereof with the face-plate removed, and Fig. 3 is an elevation with parts in section on line 3 3 of Fig. 2.

The instrument shown is a well-known form of thermostat; but I desire it to be understood that my present invention has no reference to the specific construction of a thermostat proper and any suitable or approved form may be used. The bar or rod $a$, which expands under the influence of heat and contracts when cooled, controls the circulation of air which actuates the diaphragm $b$, which in turn controls by its action the admission of the heating fluid, this being effected through the medium of a spring-pressed lever or yoke $c$, fulcrumed at $d$, which in the present case is used to operate the indicator; but it will be understood that any other moving part of the thermostat may be used for this purpose. As shown, the moving part—that is, the yoke $c$—has a projecting pin $e$, which engages the slotted arm of the bell-crank lever $f$, fulcrumed at $f'$ to a bracket $f^2$, attached to the frame of the instrument by the screw $f^3$ and connected at its other end by a link $g$ with another bell-crank lever, $h$, fulcrumed at $h'$ upon a bracket $h^2$, attached to the frame of the instrument by the screw $h^3$. The two axes $f'$ and $h'$, about which the bell-crank levers $f$ and $h$ swing, are arranged at right angles to each other. The bell-crank lever $h$ carries the toothed sector $i$, engaging a pinion $j$ on an arbor $k$, carrying a pointer $l$, the arbor $k$ being supported by bearings in the bracket $h^2$. This pointer shows through a segmental sight portion $m'$ of the backing or support to which the thermometer $n$ is secured. At the bottom of said support is located another pointer or indicator, $o$, fulcrumed at $o'$ and adapted to be turned by means of a suitable head $o^2$, this pointer indicating on the graduation or scale $p$, which is marked with the words "Warmer" and "Cooler," as usual, and the pointer is also operatively connected with the thermostat, so that an adjustment of the pointer will vary the action of the thermostat so as to admit more or less heat.

The upper indicator $l$, visible through the sight portion $m'$, which is either a perforation or a transparent portion, indicates in one position—say, for example, its position at the right—that the damper controlling the admission of heating fluid to the radiator or heating apparatus is closed, while in the opposite position—say that to the left—it indicates that the said damper or valve is open.

Having described my invention, what I claim, and desire to secure by Letters Patent, is—

In a device for indicating the position of a thermostatically-controlled valve, the combination, with the thermostat and the valve or damper governed thereby and controlling the flow of an active fluid, of a lever controlled by said thermostat, a bell-crank lever operatively connected with the first-named lever, a link connected with said bell-crank lever, another bell-crank lever connected with said link, and having its axis disposed transversely of the axis of the first-named bell-crank lever, a toothed sector carried by the said other bell-crank lever, a pinion engaging said sector, and a pointer or indicator mounted to turn with said pinion.

MAJOR S. BELL.

Witnesses:
JOHN LOTKA,
EUGENE EBLE.